UNITED STATES PATENT OFFICE.

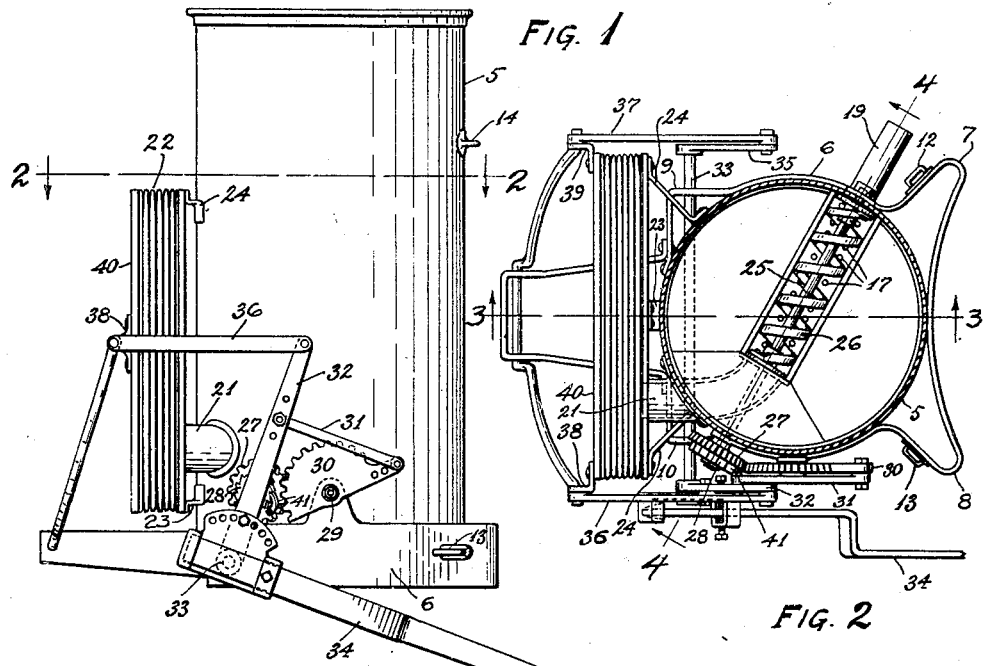
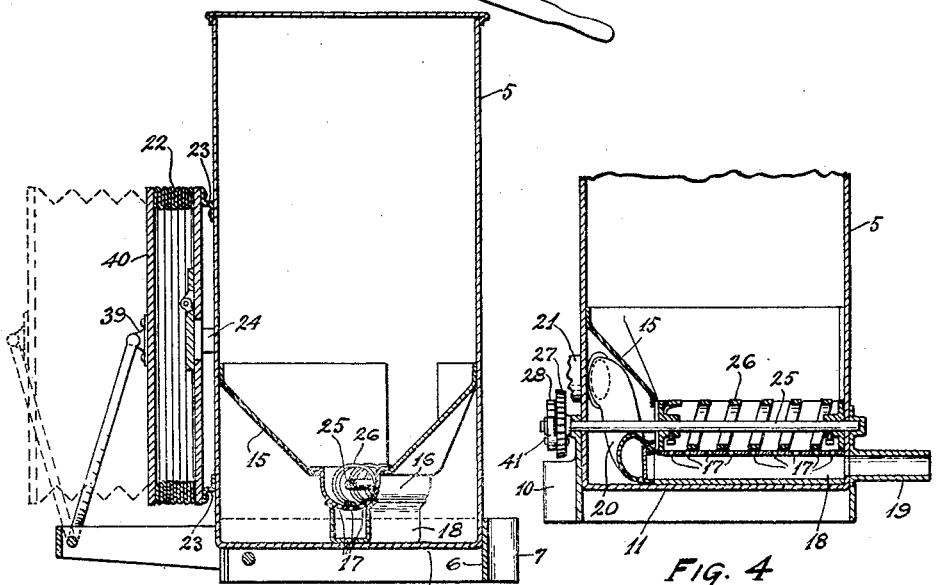

JOHN S. DAVIS, OF SEATTLE, WASHINGTON, ASSIGNOR TO THE CALIFORNIA SPRAYER COMPANY, OF LOS ANGELES, CALIFORNIA, A CORPORATION OF CALIFORNIA.

PORTABLE SPRAYING-MACHINE.

1,371,412.  Specification of Letters Patent.  Patented Mar. 15, 1921.

Application filed November 20, 1916. Serial No. 132,487.

*To all whom it may concern:*

Be it known that I, JOHN S. DAVIS, a citizen of the United States, residing at Seattle, in the county of King and State of Washington, have invented a certain new and useful Improvement in Portable Spraying-Machines, of which the following is a specification.

My invention relates to improvements in portable spraying machines, and the object of my invention is to provide a spraying machine which may be operated while being carried upon one's back to spray a desired pulverized chemical matter, as powdered sulfur or powdered lime, upon fruit trees, shrubs and plants, and which shall embody a container for such powdered matter, together with a flexible hose and operative mechanism adapted to eject portions of said powdered matter outwardly from said container and through said hose at different times as desired.

I accomplish this object by devices illustrated in the accompanying drawings, wherein Figure 1 is a side elevation of one form of spraying machine embodying my invention; Fig. 2 is a view of the same in horizontal section on broken line 1—1 of Fig. 1; Fig. 3 is a view of the same in vertical section on broken line 2—2 of Fig. 2; and Fig. 4 is a fragmentary view in vertical section on broken line 3—3 of Fig. 2.

Referring to the drawings, throughout which like reference numerals designate like parts, 5 is a container of the form of a hollow cylinder to whose bottom end portion is secured a bracket 6, two portions 7 and 8 of which project outwardly from the circular wall of the container 5 whereby is formed the curved portion extending between said portions 7 and 8, which curved portion is adapted to rest against the lower portion of a person's back.

Integral with said bracket 6 are two other angular projections 9 and 10 disposed at corresponding points on the opposite side of said container 5, the lower edge portions of said bracket 6 projecting below the bottom wall 11 of the container 5.

Secured to each of the portions 7 and 8 on the rearward side thereof is a cleat, as cleats 12 and 13, to which may be fastened a strap, not shown, that may extend upwardly over a person's shoulder, thence to cleats, like the cleat 14, which are secured to the upper portion of the outer surface of the circular wall of the container 5, as shown more clearly in Fig. 1, thus to adapt the structure to be carried on a person's back.

Within the container 5, spaced from the bottom wall 11, is a partition which forms a hopper 15, and within the bottom of said hopper 15 is a semi-circular trough 16 which projects downwardly through the bottom of said hopper 15, as shown more clearly in Fig. 3, and the bottom wall of said trough 16 is perforated throughout its length with holes 17.

Disposed to extend between the bottom of the trough 16 and the bottom wall 11, parallel with said trough 16, is a conduit 18 one end of which communicates with a nipple 19 through a hole in the circular wall of the container 5, said nipple 19 being secured to the outer surface of said container 5, as shown more clearly in Figs. 2 and 4, while the other end of said conduit 18 connects with a pipe 20 which is curved to extend upwardly to communicate with a nipple 21 fixed in the circular wall of said container 5, as shown in Fig. 4.

The nipple 21 connects with the fixed side of a bellows 22 which is attached to the vertical circular wall of the container 5 by brackets 23 and 24.

Thus air from said bellows 22 may be forced through said nipple 21 into said pipe 20, thence through the conduit 18, and then through the nipple 19 and into and through a hose, not shown, that may be attached to said nipple 19.

Extending lengthwise within the semi-circular trough 16 is a rotatable shaft 25 upon which is mounted a scraper 26 of helical form whose periphery engages with the inner surface of the semi-circular trough 16 whereby in response to a rotation of the shaft 25 said scraper will act to force any pulverized matter that may be contained in said hopper 15 through the holes 17 in the bottom of said semi-circular trough 16, to cause such pulverized matter to fall into the conduit 18 to be carried by a current of air therefrom through the nipple 19 into and through a hose that may be attached thereto.

One end of the shaft 25 extends outwardly through the circular wall of the container 5 to project therefrom and on such outwardly projecting end portion of said shaft 25 is mounted a beveled gearwheel 27 and a ratchet wheel 28, the ratchet wheel 28 being rigidly attached to the shaft 25 while the gearwheel 27 is freely mounted thereon, and secured to one side of the gearwheel 27 is a pawl 41 adapted to engage with the teeth of the ratchet wheel 28 whereby a revolution of the gearwheel 27 in one direction will rotate the shaft 25, but a revolution of said gearwheel 27 in an opposite direction will not rotate said shaft 25.

Pivotally mounted on a stud 29 fixed to the bracket 6 is a segment 30 of a beveled gearwheel disposed to engage with the beveled gearwheel 27.

Articulated with the segment 30 is a connecting rod 31 which extends to and connects with an arm 32 that is rigidly connected to one end portion of a shaft 33 which is rotative in bearings formed in the angular projections 9 and 10, whereby a rotative movement of said shaft 33 will actuate the arm 32 to rotate said segment 30.

Adjustably mounted on said one end portion of said shaft 33, adjacent to the outer side of said arm 32, is a hand lever 34 which is adapted to be swingingly moved by the right hand of a person upon whose back the structure is carried whereby said shaft 33 may be rotated in alternate directions, thus to rotate the shaft 25 in the same direction step by step.

Upon the other end of the shaft 33 directly opposite the arm 32 and corresponding therewith is rigidly mounted another arm 35 and to the top end portion of each of said arms 32 and 35 is articulated a connecting rod, as connecting rods 36 and 37, which connecting rods 36 and 37 extend rearwardly and are articulated to brackets 38 and 39, respectively, that are attached to the movable side wall 40 of the bellows 22, as more clearly shown in Fig. 2, whereby when the arms 32 and 35 are oscillated by the hand lever 34, the bellows 22 will be actuated to blow out from the conduit 18 through the nipple 19 any pulverized matter that may fall through the holes 17 into said conduit 18 in response to the action of the scraper 26 which will rotate step by step in response to oscillations of the hand lever 34.

Thus, if a desired pulverized chemical matter, as, for instance, powdered sulfur, be disposed within the container 5 and the structure then be strapped to a person's back and a flexible hose be attached to the nipple 19, then such person with his right hand may at desired times actuate the lever 24 to cause the bellows 22 to eject successive quantities of such powdered sulfur out of the free end of said hose which may be manipulated by said person's left hand to spray such ejected powdered sulfur upon a tree or plant.

Obviously changes may be made in the forms, dimensions and arrangement of parts of my invention without departing from the spirit thereof.

What I claim is:

1. A portable spraying device comprising a container, a bracket secured to the bottom of said container, a saddle secured to said bracket and disposed against the front side of said container, a bellows secured against the rear side of said container above said bracket, a hopper located in said container and having a trough located in its bottom wall, a conduit located in the container between said bottom thereof and trough and communicating with the latter, a scraper mounted on a shaft in said trough to force the contents in the trough into said conduit, and manually operating means for the scraper and bellows to simultaneously operate the same.

2. A portable spraying device comprising a container, a bracket secured to the bottom of said container, a saddle secured to said bracket and disposed against the front side of said container, a bellows secured against the rear side of said container above said bracket, a hopper located in said container and having a trough located in its bottom wall, a conduit located in said container between the bottom thereof and trough and communicating with the latter, a scraper mounted on a shaft in said trough to force the contents in the trough into said conduit, operating means for said scraper shaft, said operating means including a lever pivoted to said bracket, a segment pivoted to said bracket above said lever, rods pivotally connecting said segment and bellows to said lever, a ratchet wheel rigidly secured to the outer end of said scraper shaft, a bevel gear loosely mounted on said shaft adjacent said ratchet wheel, and means to engage said ratchet wheel whereby upon movement of the lever said bellows and scraper will be operated and an intermittent rotation given to the scraper shaft in one direction.

In witness whereof I hereunto subscribe my name this 12 day of November, A. D. 1916.

JOHN S. DAVIS.

Witnesses:
FRANK WARREN,
GEO. BLAIN.